3,098,070
9-HALOGENATED 18:11-LACTONES OF 11β-HYDROXY-PREGNANE-18-ACIDS
Charles Meystre, Basel, Albert Wettstein, Riehen, and Georg Anner, Karl Heusler, and Peter Wieland, Basel, Switzerland, assignors to Ciba Corporation, a corporation of Delaware
No Drawing. Filed Dec. 8, 1960, Ser. No. 74,488
Claims priority, application Switzerland Dec. 11, 1959
8 Claims. (Cl. 260—239.57)

This invention relates to new 9-halogenated 18:11-lactones of 11β-hydroxy-pregnane-18-acids which in 20-position contain a free or esterified hydroxyl group or an oxo group, and in 21-position are unsubstituted or contain a free, an esterified, or an etherified hydroxyl group, especially compounds of the formula

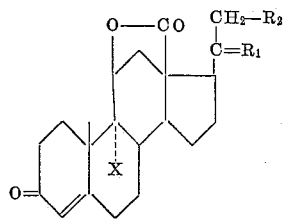

in which X represents a fluorine, chlorine, or bromine atom, and $R_1$ a hydrogen atom and a free or esterified hydroxyl group or a free or ketalized oxo group, and $R_2$ a hydrogen atom or a free, an esterified, or an etherified hydroxyl group, and to the corresponding 3-ketals.

These products are valuable intermediates for the preparation of 9α-halogenated derivatives of aldosterone and similar compounds, especially of 9α-chloro-aldosterone and 9α-fluoro-aldosterone. Typical representatives of these classes of compounds are the 18:11β-lactones of 9α-halogenated $\Delta^4$-3-oxo-11β:20β-dihydroxy-pregnene-18-acid, 9α-halogenated $\Delta^5$-3-ethylenedioxy-11β:20β-dihydroxy-pregnene-18-acid, particularly the $\Delta^4$-3-oxo-9α-bromo-11β:20β-dihydroxy-pregnene-18-acid, the $\Delta^4$-3-oxo-9α-chloro-11β:20β-dihydroxy-pregnene-18-acid, the $\Delta^4$-3-oxo-9α-fluoro-11β:-20β-dihydroxy-pregnene-18-acid.

By treating the 18:11β-lactones of $\Delta^4$-3-oxo-11β:20β-dihydroxy-9-halogen-pregnene-18-acids with ethylene glycol and para-toluene sulfonic acid in benzene at the boiling temperature there are obtained the corresponding $\Delta^5$-3-ethylene-dioxy compounds, e.g. the 18:11β-lactones of $\Delta^5$-3-ethylene-dioxy-9α-fluoro-, -9α-chloro-, and -9α-bromo-11β:20β-dihydroxy-pregnene-18-acids. The new 18:11β-lactones of $\Delta^4$-3-oxo- and $\Delta^5$-3-ethylenedioxy-9α-halogen-11β:20β-dihydroxy-pregnene-18-acids are dehydrogenated with chromium trioxide in glacial acetic acid or in pyridine to form the corresponding 20-ketones in a manner quite analogous to that used for the unhalogenated compounds. There are thus obtained the 18:11β-lactones of $\Delta^4$-3:20-dioxo-9α-fluoro-, -9α-chloro-, -9α-bromo-11β-hydroxy-pregnene-18-acids and the $\Delta^5$-3-ethylenedioxy - 9α - fluoro, -9α-chloro-, -9α-bromo-11β-hydroxy-20-oxo-pregnene-18-acids and the $\Delta^5$-3-ethylenedioxy-11β-hydroxy-20-oxo-19-nor-pregnene-18-acid.

To obtain the known 9-halogen-aldosterones, the $\Delta^5$-3-ketals are converted by the method known for the unhalogenated compounds by oxalic ester condensation, iodination and cleavage with sodium acetate into the 18:11-lactones of $\Delta^5$-3-ethylenedioxy-9α-fluoro-, -9α-chloro-, and 9α-bromo-11β-hydroxy-20-oxo-21-acetoxy-pregnene-18-acids which on treatment with aqueous perchloric acid in tetra-hydrofuran yield the 18:11-lactones of $\Delta^4$-3:20-dioxo-11β:21-dihydroxy-9α-fluoro-, -9α-chloro-, and -9α-bromo-pregnene-18-acid. By ketalization, reduction with lithium aluminum hydride and ketal cleavage, these are converted into the known 9α-fluoro-, -9α-chloro-, and 9α-bromo-aldosterone ($\Delta^4$-3:18:20-trioxo-11β:21-dihydroxy-9α-fluoro-, -9α-chloro-, and -9α-bromo-pregnene).

The 18:11-lactones of $\Delta^4$-3-oxo-9α-halogen-11β:20β-dihydroxy-pregnene-18-acids are prepared by treating the 18:20β-lactones of $\Delta^4$-3-oxo-9:11β-oxido-20β-hydroxy-pregnene-18-acids with hydrohalic acid and then translactonizing the resulting 18:20-lactones of 9α-halogen-11β-hydroxy-pregnene-18-acids. The 9α-bromo-lactones can alternatively be prepared by direct additive combination of hypobromous acid with the 18:20-lactone of $\Delta^{4,9(11)}$-3-oxo-20β-hydroxy-pregnadiene-18-acid. The said $\Delta^{9,11}$- and 9:11β-oxido-18:20-lactones are prepared from $\Delta^{9,11}$- or 9:11β-oxido-20β-hydroxy-pregnane compounds by a process described in applications Serial Nos. 74,486, filed December 8, 1960; 74,487, filed December 8, 1960; and 74,470, filed December 8, 1960. That process consists in treating 18-unsubstituted 20β-hydroxy-pregnane compounds with a lead acylate having oxidizing action in the presence of iodine and oxidizing the resulting products with chromium trioxide with the addition of silver chromate. It is then possible to form e.g. a 9:11-double bond by splitting off in known manner any 11α-hydroxyl group present.

The preparation of the new compounds is described in greater detail in the following examples, the temperatures being given in degrees centigrade.

*Example 1*

6.0 g. of lead tetraacetate are dried for 30 minutes in a water-jet vacuum and for 30 minutes in a high vacuum. After the addition of 2 g. of calcium carbonate and 200 ml. of cyclohexane, the substance is stirred while being heated to the boil, treated with 1.6 g. of iodine, and refluxed for another hour. 1 g. of $\Delta^{5,9,11}$-3-ethylenedioxy-20β-hydroxy-pregnadiene is added to the boiling solution, followed by rinsing with 12 ml. of cyclohexane, and the whole is boiled and stirred for 4 hours. The reaction mass is then cooled, filtered, and washed with absolute ether. The filtrate is washed with an ice-cold solution of 5 g. of sodiumthiosulfate in 20 ml. of water, and 3 times with water, after which the aqueous solutions are extracted twice by agitation with ether. The organic solutions are combined in a flask containing 3 g. of sodium acetate and 3 g. of glacial acetic acid and evaporated in a water-jet vacuum at a bath temperature of 50°. The residue is treated with 30 ml. of 80% acetic acid, heated for 2 hours on the boiling water bath, cooled, and evaporated nearly to dryness in a water-jet vacuum. After the addition of ether, the substance is washed with water, 2 N-sodium carbonate solution and water, then dried and evaporated in a water-jet vacuum. The residue which contains the $\Delta^{4,9,11}$-3-oxo-18-hydroxy-18:20-oxido-pregnadiene is dissolved in 6 ml. of pyridine and added to a solution of 1.5 g. of chromium trioxide in 3 ml. of water and 3 ml. of pyridine. The reaction mass is allowed to stand at room temperature for 20 hours, then treated with 20 g. of ice, and there are then added slowly 10 ml. of a 40% sodium bisulfite solution and, 10 minutes later, 2 N-hydrochloric acid until an acid reaction to Congo red is reached. Extraction with ethyl acetate follows, and the ethyl acetate solution is washed with 2 N-sodium carbonate solution and water. The organic solution is dried and evaporated and the residue chromatographed over 40 g. of silica gel containing 15% of water. The fractions eluted with 19:1 mixtures of benzene and ethyl acetate yield the 18:20-lactone of $\Delta^{4,9,11}$-3-oxo-20β-hydroxy-pregnadiene-18-acid which after recrystallization from a mixture of methylene chloride and ether melts at 205–210°.

The fractions eluted with 9:1-mixtures of benzene and ethyl acetate yield a substance which contains an acetoxy group in addition to the other groups. Presumably it has the structure of the 18:20-lactone of $\Delta^{4:9:11}$-3-oxo-12-acetoxy-20$\beta$-hydroxy-pregnadiene-18-acid.

500 m. of the 18:20-lactone of $\Delta^{4:9:11}$-3-oxo-20$\beta$-hydroxy-pregnadiene-18-acid are dissolved in 10 ml. of pure dioxane and the solution treated with 2 ml. of water, then with 300 mg. of N-bromosuccinimide and 1 ml. of 10% perchloric acid. The mixture is stirred for 15 minutes at room temperature, the excess hypobromous acid destroyed by the addition of sodium sulfite solution, and the whole poured into 75 ml. of ice-water. The resulting precipiate is taken up in methylene chloride, the solution dried and evaporated. The residue consists of the crude 11:18-lactone of $\Delta^4$-3-oxo-9$\alpha$-bromo-11$\beta$:20$\beta$-dihydroxy-pregene-18-acid, which is purified by chromatography over silica gel.

By oxidizing 222 mg. of the crude product in 3 ml. of glacial acetic acid with 200 mg. of chromium trioxide and 0.2 ml. of water for 4 hours there is obtained the 18:11 - lactones of $\Delta^4$-3:20-dioxo-9$\alpha$-bromo-11$\beta$-hydroxy-pregnene-18-acid.

By ketalizing the 18:11-lactone of $\Delta^4$-3-oxo-9$\alpha$-bromo-11$\beta$:20$\beta$-dihydroxy-pregnene-18-acid with ethylene glycol and para-toluenesulfonic acid in benzene there is obtained the 18:11-lactone of $\Delta^5$-2-ethylenedioxy-9$\alpha$-bromo-11$\beta$:20$\beta$-dihydroxy-pregnene-18-acid.

100 mg. of the 18:11-lactone of $\Delta^5$-3-ethylenedioxy-9$\alpha$-bromo-11$\beta$:20$\beta$-dihydroxy-pregnene-18-acid are dissolved in 1 ml. of pyridine. The solution is treated with a mixture of 200 mg. of chromium trioxide in 0.4 ml. of water and 1 ml. of pyridine, and the mixture heated at 60° for 15 hours. The reaction mixture is then treated with ice and some sodium sulfite solution, extracted with ethyl acetate, washed with 1.5 N-phosphoric acid and ice water, dilute sodium carbonate solution and water, then dried and evaporated under reduced pressure. From the residue there is obtained the 18:11-lactone of $\Delta^5$-3-ethylenedioxy - 3:20-dioxo-9$\alpha$-bromo-11$\beta$-hydroxy-pregnene-18-acid. IR spectrum: bands inter alia at 5.62$\mu$ (5-membered ring lactone), 5.82$\mu$ (20-ketone), and 9.07$\mu$ ($\Delta^5$-3-ketal).

*Example 2*

6.0 g. of lead tetraacetate containing acetic acid are dried first in a water-jet vacuum, then under a pressure of 0.1 mm. of Hg. before they are added to a suspension of 2.0 g. of dry calcium carbonate in 200 ml. of cyclohexane. The compound is heated to the boil and there are added 1.6 g. of iodine and the whole refluxed for 1 hour. After that 1.0 g. of $\Delta^5$-3-ethylenedioxy-9:11$\beta$-oxido-20$\beta$-hydroxy-pregnene is added and the solution boiled for another 3 hours with irradiation by means of a 500 w. lamp. During the reaction period the solution discolors completely. After cooling, the undissolved salts are filtered off and the residue washed well with ether. The filtrate is washed with sodium thiosulfate solution and water and evaporated in a water-jet vacuum at a bath temperature of 25–30°. The residue is dissolved in 10 ml. of pyridine and added to a mixture of 1.0 g. of chromium trioxide, 2.0 of silver chromate in 10 ml. of water and 10 ml. of pyridine which has first been stirred for one hour and cooled to 0°. The reaction mixture is then stirred for 48 hours at 40°, then cooled and treated with ether and dilute sodium chloride solution. The insoluble salts are removed by filtration, the organic layer is separated and extracted several times with ether. The extracts are washed with water, dried and evaporated in a water-jet vacuum. The residue (1.07 g.) is chromatographed over silica gel. Elution with benzene-ethyl acetate mixtures yields the pure 18:20-lactone of $\Delta^5$-3-ethylenedioxy-9:11$\beta$-oxido-20$\beta$-hydroxy-pregnene-18-acid.

250 mg. of the 18:20-lactone of $\Delta^5$-3-ethylene-dioxy-9:11$\beta$-oxido-20$\beta$-hydroxy-pregnene-18-acid are dissolved in 1.5 ml. of methylene chloride and added slowly to a mixture, cooled to −60° of 10.3 ml. of tetrahydrofuran, 3.6 ml. of methylene chloride and 5.0 ml. of anhydrous hydrofluoric acid. When the addition is complete, the mixture is left to itself for 15 minutes at −60°, then for 3 hours at 0° before it is poured into a cold solution of sodium bicarbonate. The mixture is then extracted with methylene chloride, the extracts washed with water, dried and evaporated. The residue (240 mg.) is filtered through 12 g. of silica gel. Elution with benzene-ethyl acetate mixtures and with ethyl acetate yields the 18:11-lactone of $\Delta^4$-3-oxo-9$\alpha$-fluoro - 11$\beta$:20$\beta$ - dihydroxy-pregnene-18-acid.

105 mg. of this compound are dissolved in 2 ml. of glacial acetic acid and after the addition of 200 mg. of chromium trioxide in 0.5 ml. of water allowed to stand for 5 hours at 25°. Usual working up yields a crude product from which the pure 18:11-lactone of $Y^4$-3:20-dioxo-9$\alpha$-fluoro-11$\beta$-hydroxy-pregnene-18-acid can be obtained by crystallization from a mixture of methylene chloride and ether.

285 mg. of the 18:11-lactone of $\Delta^4$-3-oxo-9$\alpha$-fluoro-11$\beta$:20$\beta$-dihydroxy-pregnene-18-acid are dissolved in 100 ml. of benzene and after the addition of a solution of 20 mg. of para-toluene sulfonic acid in 10 ml. of ethylene glycol refluxed for 6 hours with the use of a water separator. The reaction mass is then cooled, treated with 20 ml. of saturated sodium bicarbonate solution while being stirred, diluted with 50 ml. of benzene, and the organic solution then separated. The latter is washed with water, dried, and evaporated in a water-jet vacuum. The resulting crude 18:11-lactone of $\Delta^5$-3-ethylenedioxy-9$\alpha$-fluoro-11$\beta$:20$\beta$-dihydroxy-pregnene-18-acid is oxidized for 15 hours at 60° with chromium trioxide+pyridine, as described in Example 1 for the 9$\alpha$-bromine compound. The resulting crude oxidation product is purified by chromatography over silica gel. From the fractions eluted with benzene-ethyl acetate mixtures there is obtained by crystallization from ether+methylene chloride the pure 18:11-lactone of $\Delta^5$-3-ethylenedioxy-9$\alpha$-fluoro-11$\beta$-hydroxy-20-oxo-pregnene-18-acid.

When for the cleavage there is used instead of anhydrous hydrofluoric acid a solution of hydrogen chloride in methanol, there is obtained the 18:11-lactone of $\Delta^4$-3-oxo-9$\alpha$-chloro-11$\beta$:20-dihydroxy-pregnene-18-acid which, as described above for the 9-fluoro compound, is converted into the 18:11-lactone of $\Delta^4$-3:20-dioxo-9$\alpha$-chloro-11$\beta$-hydroxy-pregnene-18-acid or the $\Delta^5$-3-ethylenedioxy-9$\alpha$-chloro-11$\beta$-hydroxy-20-oxo-pregnene-18-acid.

*Example 3*

A mixture of 1.932 g. of 18:11$\beta$-lactone of $\Delta^5$-3-ethylene-dioxy-9$\alpha$-fluoro-11$\beta$-hydroxy-20-oxo-pregnene-18-acid in 90 ml. of benzene and 40 ml. of a freshly prepared benzene solution which is 0.2 N with respect to sodium methylate and 0.5 molar with respect to oxalic acid dimethyl ester, is stirred at room temperature for 16 hours with exclusion of moisture. The mixture is then poured into 80 ml. of molar sodium dihydrogen-phosphate solution, and extracted by shaking with a 1:1 mixture of chloroform and benzene. The extract is washed with water and dried with sodium sulfate, and then evaporated under reduced pressure, and the residue freed from oxalic acid dimethyl ester at 40° in a high vacuum. The crude product is recrystallized from anhydrous ether with the use of methylene chloride as solution promoter, and the 18:11$\beta$-lactone of $\Delta^5$-3-ethylenedioxy-9$\alpha$-fluoro-11$\beta$-hydroxy-20-oxo-pregnene-18-acid-21-oxalic acid methyl ester obtained.

To a suspension, cooled to 0°, of 1.892 g. of the 18:11$\beta$-lactone of $\Delta^5$-3-ethylenedioxy-9$\alpha$-fluoro-11$\beta$-hydroxy-20-oxo-pregnene-18-acid-21-oxalic acid methyl ester and 1.96 g. of dry potassium acetate in 74 ml. of methanol is added in the course of 10 minutes with exclusion of moisture and while stirring, a solution of 1.02 g. of iodine in 25 ml. of absolute methanol. The mixture is then stirred for another 3½ hours at 0°, and the separation of the iodi-ketone completed by the addition of 40 ml. of 50% aqueous methanol. The finely crystalline, colorless substance filtered off the mother liquor with suction is the 18:11β-lactone of Δ⁵-3-ethylenedioxy-9α-fluoro-11β-hydroxy-20-oxo-21-iodo-pregnene - 18 - acid. It is advantageously used for the following reaction with potassium acetate without being further purified.

The resulting 18:11β-lactone of Δ⁵-3-ethylenedioxy-9α-fluoro-11β-hydroxy-20-oxo - 21 - iodo-pregnene-18-acid is added, in 120 ml. of acetone, to potassium acetate freshly prepared from 10 g. of potassium bicarbonate and 6 ml. of glacial acetic acid, and the whole is boiled for 1 hour in an atmosphere of nitrogen on the water bath. After cooling, the greater part of the acetone is expelled by evaporation under reduced pressure, water is added to the residue which is then extracted from a 3:1 mixture of ether and methylene chloride. The extracts are washed with 0.1 N-sodium bicarbonate and water and combined, dried with sodium sulfate, and evaporated. There is obtained as residue the crude 18:11β-lactone of Δ⁵-3-ethylenedioxy-9α-fluoro-11β-hydroxy - 20 - oxo-21-acetoxy-pregnene-18-acid. For purification, the crude product is dissolved in benzene and chromatographed over 90 g. of silica gel. The fractions eluted with benzene and benzene-ethyl acetate mixtures (95:5 and 90:10) contain only impurities, while from the fractions eluted with 75:25 mixtures of benzene and ethyl acetate the pure lactone is obtained by crystallization.

358 mg. of crude 18:11β-lactone of Δ⁵-3-ethylenedioxy-9α-fluoro-11β-hydroxy-20-oxo-21- acetoxy - pregnene - 18-acid are covered with 12.1 ml. of tetrahydrofuran, and after the addition of 4.03 ml. of aqueous 4 N-perchloric acid, the mixture is agitated until dissolution of the starting material is complete. It is kept in the dark for 60 hours, then cooled in ice-water, neutralized with 32.2 ml. of 0.5 N-sodium bicarbonate solution, and the tetrahydrofuran distilled off under reduced pressure. The aqueous suspension which remains behind is extracted by agitation with methylene chloride, the extract washed with 0.2 N-sodium carbonate solution and water, dried with sodium sulfate, and evaporated. The crystalline residue is subjected to distribution chromatography on cellulose with formamide as the stationary phase and benzene as the mobile phase. The first eluates contain a slightly polar by-product which absorbs ultraviolet light. On further elution, fractions are obtained which for the greater part are capable of strongly reducing an alkaline silver diamine solution. From these fractions the 18:11β-lactone of Δ⁴-3:20-dioxo-9α-fluoro-11β:21-dihydroxy-pregnene-18-acid is obtained.

Example 4

In a Claisen fractionator 1.933 g. of 18:11β-lactone of Δ⁵-3-ethylenedioxy-9α-fluoro-11β-hydroxy-20-oxo-pregnene-18-acid are covered with 250 ml. of an 0.002-molar solution of para-toluene sulfonic acid in purest ethylene glycol. At a bath temperature of 80–90° and under a pressure of about 1 mm. about 120 ml. of ethylene glycol are distilled off in the course of 5 hours. By increasing the vacuum, the reaction mixture is finally concentrated to about 10 ml. After cooling, methylene chloride is added, the methylene chloride solution is washed three times with 0.02 N-sodium bicarbonate solution, 8 times with water, and dried over sodium sulfate. On evaporation of the solvent at 40° under reduced pressure there are obtained 2.182 g. of crude 18:11β-lactone of Δ⁵-3:20-bisethylenedioxy-9α-fluoro-11β-hydroxy-pregnene-18-acid.

To 735 mg. of this diketal, dissolved in 25 ml. of absolute tetrahydrofuran, 1.4 ml. of a molar lithium aluminum hydride solution in tetrahydrofuran are added in the course of 10 minutes while stirring under an atmosphere of nitrogen and with the exclusion of moisture. After 2½ hours, 1.6 ml. of acetic anhydride are added and the whole is boiled under reflux for 2 hours. After cooling, 5 ml. of a saturated sodium sulfate solution and 3 g. of magnesium sulfate are added, the precipitate is filtered off with suction, and the filter residue is washed with 50 ml. of benzene. The filtrate is evaporated in a water-jet vacuum, the residue dissolved in 15 ml. of 90% aqueous acetic acid, and the solution refluxed in an atmosphere of nitrogen at a bath temperature of 140°. The reaction mass is then cooled, the solution evaporated in a water-jet vacuum, and the residue dried by repeated evaporation with xylene and benzene in a water-jet vacuum. The yellow residue is then purified in a column charged with 6 g. of silica gel. From the fractions eluted with benzene+ethyl acetate the 9α-fluoraldosterone-21-monoacetate is obtained.

In a manner analogous to that described in this example for the 9α-fluoro compound, the 9α-chloro- or 9α-bromo compounds can be converted into the 9α-chloro- or 9α-bromo-aldosterone-21-acetate, respectively.

What is claimed is:
1. The 18:11-lactone of Δ⁴-3-oxo-9α-fluoro-11β:20β-dihydroxy-pregnene-18-acid.
2. The 18:11-lactone of Δ⁴-3-oxo-9α-bromo-11β:20β-dihydroxy-pregnene-18-acid.
3. The 18:11-lactone of Δ⁵-3-ethylenedioxy-9α-fluoro-11β:20β-dihydroxy-pregnene-18-acid.
4. The 18:11-lactone of Δ⁴-3:20-dioxo-9α-fluoro-11β-hydroxy-pregnene-18-acid.
5. The 18:11-lactone of Δ⁴-3:20-dioxo-9α-bromo-11β-hydroxy-pregnene-18-acid.
6. The 18:11-lactone of Δ⁵-3-ethylenedioxy-9α-fluoro-11β-hydroxy-20-oxo-pregnene-18-acid.
7. The 18:11-lactone of Δ⁵-3-ethylenedioxy-9α-bromo-11β-hydroxy-20-oxo-pregnene-18-acid.
8. A compound of the formula

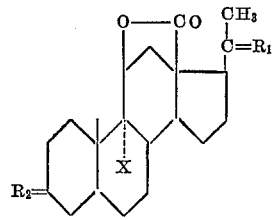

in which X is a member selected from the group consisting of fluorine, chlorine and bromine, $R_1$ is a member selected from the group consisting of an oxo group, a ketalized oxo group, a hydrogen atom together with a hydroxyl group and a hydrogen atom together with a hydroxyl group esterified with a lower hydrocarbon carboxylic acid and $R_2$ is a member selected from the group consisting of (1) an oxo group in the compounds having a double bond in the 4:5-position and (2) a ketalized oxo group in the compounds having a double bond in the 5:6-position.

References Cited in the file of this patent

UNITED STATES PATENTS

| | | |
|---|---|---|
| 2,852,511 | Fried | Sept. 16, 1958 |
| 2,960,503 | Weinstock et al. | Nov. 15, 1960 |

OTHER REFERENCES

Heusler et al., Experentia, Jan. 15, 1960, vol. 16, No. 1, p. 23, Cpds. 14, 15 and 16.

Schaffner, Experentia, May 15, 1960, vol. 16, No. 5, p. 180, Cpd. 98.

Nussbaum et al., Journ. Am. Chem. Soc., June 5, 1960, p. 2973, Cpd. 5.

Wolf et al., Journ. Am. Chem. Soc., Aug. 5, 1960, vol. 82, p. 4117, Cpd. 17.